United States Patent [19]

Snyder, Jr. et al.

[11] 4,312,706
[45] Jan. 26, 1982

[54] SPACER GRID ASSEMBLY AND LOCKING MECHANISM

[75] Inventors: Harold J. Snyder, Jr., Rancho Santa Fe; Anthony R. Veca; Harry A. Donck, both of San Diego, all of Calif.

[73] Assignee: The United States of America as represented by the United States Department of Energy, Washington, D.C.

[21] Appl. No.: 130,995

[22] Filed: Mar. 17, 1980

[51] Int. Cl.³ ............................................. G21C 3/30
[52] U.S. Cl. ..................................... 376/442; 376/438
[58] Field of Search ..................................... 176/76, 78

[56] References Cited

U.S. PATENT DOCUMENTS

| | | | |
|---|---|---|---|
| 3,281,327 | 10/1966 | Webb | 176/76 |
| 3,463,703 | 8/1969 | Crandall | 176/78 |
| 3,607,640 | 9/1971 | Krawiec | 176/78 |
| 3,764,471 | 10/1973 | Ripley | 176/78 |
| 4,021,300 | 5/1977 | Marshall | 176/78 |
| 4,081,324 | 3/1978 | Flora | 176/78 |
| 4,152,205 | 5/1979 | Kröpfl | 176/76 |
| 4,175,004 | 11/1979 | Jabsen | 176/78 |

Primary Examiner—Donald P. Walsh

[57] ABSTRACT

A spacer grid assembly is disclosed for retaining a plurality of fuel rods in substantially parallel spaced relation, the spacer grids being formed with rhombic openings defining contact means for engaging from one to four fuel rods arranged in each opening, the spacer grids being of symmetric configuration with their rhombic openings being asymmetrically offset to permit inversion and relative rotation of the similar spacer grids for improved support of the fuel rods. An improved locking mechanism includes tie bars having chordal surfaces to facilitate their installation in slotted circular openings of the spacer grids, the tie rods being rotatable into locking engagement with the slotted openings.

22 Claims, 5 Drawing Figures

SPACER GRID ASSEMBLY AND LOCKING MECHANISM

The government of the United States of America has rights in this invention pursuant to Department of Energy Contract No. DE-AT03-76SF71023.

BACKGROUND OF THE INVENTION

The present invention relates to an improved grid assembly and locking mechanism for positioning a plurality of fuel rods in a nuclear reactor and more particularly to such a combination for use in a gas-cooled gast breeder reactor.

Nuclear fission reactions and the reactors in which they take place are well known in the art. A typical reactor includes a chain-reacting assembly or reactor core made up of nuclear fuel material contained in fuel elements. The fuel material is generally encased in a corrosion resistant heat conductive shell or cladding. The reactor core is made up of a plurality of fuel rods positioned in spaced-apart relation, the reactor core being enclosed within a container through which a reactor coolant is circulated. The reactor coolant is heated during passage through the reactor core and then circulated from the reactor core for extraction of its thermal energy to perform useful work. The coolant is then recycled to the reactor at a reduced temperature to continue the process.

The present invention is particularly concerned with the reactor core for gas-cooled nuclear reactors, especially fast breeder reactors. The core for such reactors consists of a multiplicity of fuel rods which are fastened to a rod holding plate formed with passage holes for the coolant, the fuel rods being connected by means of perforated end caps to a fission gas exhaust system. Such fuel assemblies are commonly referred to as vented fuel assemblies in which fission gases forming within the interiors of the respective fuel rods are transported to a fission gas collection system to prevent excessive pressure from developing within the fuel rod interiors.

The present invention is particularly concerned with a spacer grid assembly for positioning the fuel rods in parallel spaced-apart relation and for resisting substantial disruptive forces which tend to develop within such reactors. For example, the spacer grid assemblies perform a number of functions within the reactor core. Initially, they provide sufficient strength to limit fuel rod bowing and to resist substantial vibration, thermal and hydraulic forces developing within the reactor. The spacer grid assembly also provides sufficient contact with the fuel rods along their length in order to minimize damage to the fuel rods, to accommodate fuel rod swelling and to allow fuel rod insertion or replacement during operation. At the same time, the spacer grid assembly must be designed to minimize neutron absorption and to facilitate the free passage of coolant through the fuel rods in the reactor core.

In a conventional gas-cooled fast reactor spacer grid assembly, a plurality of spacer grids are arranged at spaced intervals along the lengths of the fuel rods. Commonly, each spacer grid is designed for three-point engagement with each fuel rod. Such an arrangement has been found to produce binding between the fuel rods and spacer grids during operation, particularly because of the possibility of differentially swelling in the fuel rods and spacer grids. Since the fuel rods are at a substantially higher temperature than the supporting spacer grid assembly, the fuel rods may experience differential volumetric growth as much as fifty percent greater than the spacer grid assembly.

At the same time, it is necessary to facilitate assembly of the reactor core as well as replacement of its component parts during operation. The need for simplified assembly and replacement techniques may be better understood by considering the large number of fuel rods contained within a typical reactor core.

Accordingly, there has been found to remain a need for an improved spacer grid assembly to assure proper support for the fuel rods within such a reactor core. At the same time, there has also been found to remain a need for an improved locking mechanism for preventing relative rotation of spacer grids arranged along the length of the fuel rods.

SUMMARY OF THE INVENTION

It is therefore an object of the invention to provide a spacer grid assembly for retaining a plurality of fuel rods in substantially parallel spaced relation. In accomplishing this, a plurality of spacer grids are arranged along the length of the fuel rods, each spacer grid defining a multiplicity of rhombic openings with contact means for ninety degree spaced-apart engagement with from one to four fuel rods arranged in each rhombic opening, the rhombic openings in pairs of spacer grids being relatively offset to insure engagement of the contact points about the periphery of each fuel rod.

The spacer grids forming such a spacer grid assembly are preferably of symmetrical configuration permitting a plurality of similarly configured spacer grids to be arranged along the length of the fuel rods. Accordingly, it is also an object of the invention to provide a symmetric spacer grid having a multiplicity of rhombic openings as described above, the rhombic openings being asymmetrically offset within the grid structure to permit inversion and rotation of the spacer grids relative to each other within a single spacer grid assembly in order to achieve engagement with each fuel rod at a number of locations about its periphery.

It is yet another object of the invention to provide a tie rod locking mechanism for resisting relative rotation between a plurality of spacer grids such as those described above. However, it is particularly important to note that the tie rod locking mechanism may also be employed with other spacer grid configurations. The tie rod locking mechanism comprises one or more tie rods having chordal flats facilitating installation of the tie rods within slotted circular openings formed in aligned relation by the spaced apart spacer grids, the tie rod then being rotatable into locked engagement with each of the spacer grids. The configuration of the tie rods and the receiving openings within the spacer grids are preferably selected to permit inversion and rotation of symmetrically configured spacer grids, the openings for receiving the tie rods being uniformly spaced in angular relation about the spacer grid in order to receive the tie rod regardless of the orientation of the spacer grid.

Additional objects and advantages of the present invention are made apparent in the following description having reference to the accompanying drawings.

DESCRIPTION OF THE PREFERRED EMBODIMENTS

As was noted above, the present invention is concerned with three basic concepts which may preferably be employed together. However, although these three concepts are interrelated within the present invention, certain features thereof may also be separately employed as will be more apparent from the following description. For example, a spacer grid assembly is illustrated in FIG. 4 comprising a plurality of spaced-apart spacer grids each forming a multiplicity of rhombic openings having approximately ninety degree spaced-apart contact means for engagement with from one to four fuel rods arranged within each rhombic opening. The spacer grid at each level within the fuel rod assembly of FIG. 4 provides only two contact points with each fuel rod in order to prevent binding of the type described above. In addition, the configuration of the spaced-apart spacer grids is further selected in order to assure arrangement of the contact points at different levels in spaced-apart relation about the periphery of each fuel rod. Preferably, the spacer grids are of similar symmetric configuration so that a single spacer grid configuration may be employed at the various spaced-apart locations along the length of the fuel rods, the spacer grid configuration being adapted to permit inversion and/or relative rotation of selected spacer grids in order to achieve better contact with each of the fuel rods along its length. At the same time, the spacer grid assembly also includes a tie rod locking mechanism which will best be understood with reference to FIGS. 2, 3 and 4. The tie rod locking concept of the present invention provides a particularly simple and effective means for preventing relative rotation between the spaced-apart grid structures. However, it is again noted that the tie rod locking mechanism as described in greater detail below may also be used in combination with specific grid structures in addition to those contemplated by the present invention.

Figure 1:
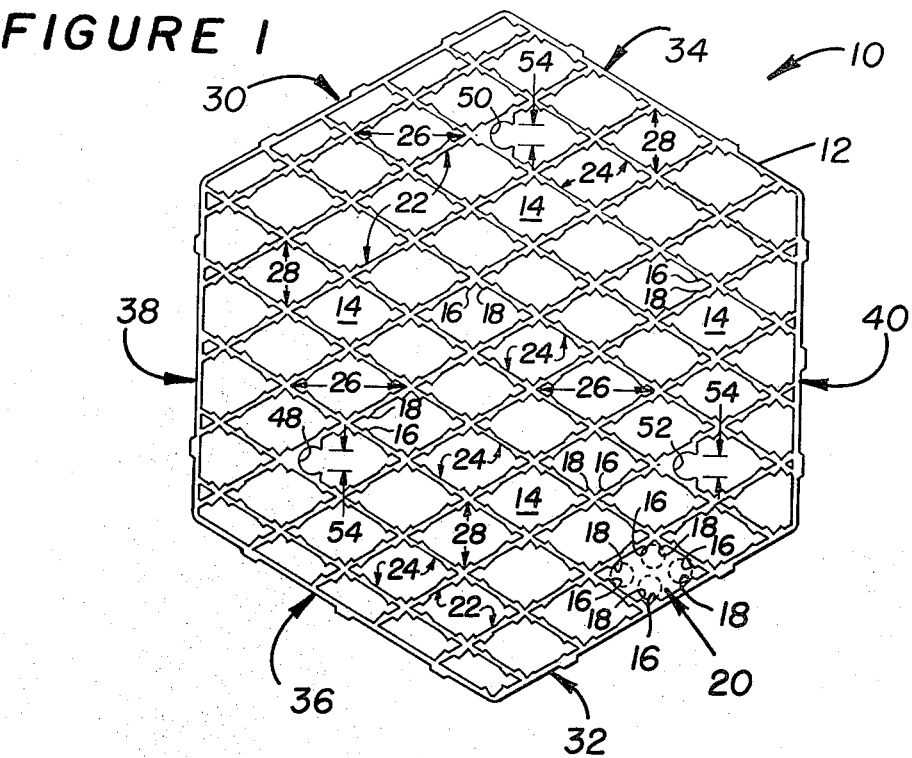
FIG. 1 is a plan view of a single symmetrical spacer grid constructed according to the present invention, a combination of similar spacer grids being employed within a spacer grid assembly for retaining a plurality of fuel rods in a reactor core.

Referring now to the drawings and particuarly to FIG. 1, a spacer grid or grid structure constructed in accordance with the present invention is generally indicated at 10. The boundary 12 of the grid structure is in the form of a symmetric hexagon with the interior of the grid structure forming a multiplicity of rhombic openings 14. In the embodiment of FIG. 1, the grid structure 10 is of an integral type construction formed for example by conventional electro-discharge machining techniques. Such techniques may include for example wire electro-discharge machining or plunge electro-discharge machining to result in an integral construction such as that illustrated in FIG. 1.

With certain exceptions noted immediately below, each of the rhombic openings 14 is formed with two contact points at each corner of the opening, each set of contact points being indicated at 16 and 18. In a fuel rod assembly such as that illustrated in FIG. 4, from one to four fuel rods may be arranged within each of the rhombic openings. Referring to FIG. 1, four such fuel rods are illustrated in phantom and indicated in combination at 20 within one rhombic opening. It may be best seen from that phantom illustration of the fuel rods that each pair of contact points 16 and 18 is arranged for engagement with each fuel rod is approximately ninety degree spaced-apart relation. As will be explained in greater detail below, this configuration facilitates engagement of the contact points about the circumference of each fuel rod with a plurality of the spacer grids being arranged along the length of the fuel rods.

It may be further seen from FIG. 1 that the arrangement of rhombic openings 14 is asymmetrically disposed within the spacer grid structure 10. In this connection, the rhombic openings 14 are generally formed by a first set of parallel, elongated elements 22 and similar intersecting elements 24. Further, each rhombic opening 14 is formed with two acute angles or ends 26 and two obtuse angles or ends 28. The contact means 16 and 18 at both the acute and obtuse angles are arranged to assure substantially ninety degree spaced-apart engagement with the respective fuel rods.

Returning again to the arrangement of the rhombic openings upon the grid structure, the asymmetric arrangement may be best seen by noting that adjacent one side 30 of the hexagonal grid structure 10, the adjacent elongated member or element 22 is spaced therefrom by approximately half the normal dimension of the rhombic openings. At the same time, adjacent the opposite side 32 of the hexagonal grid structure 10, the adjacent elongated member or element 22 is spaced therefrom by the full normal dimension of the rhombic opening. Thus, the rhombic openings adjacent the one side 30 are adapted to receive only two fuel rods while the rhombic openings adjacent the other side 32 are adapted to receive four fuel rods as illustrated by the phantom arrangement at 20. Similarly, the elongated member or element 24 arranged adjacent the grid side 34 maintains a full spacing corresponding to the normal dimension of the rhombic openings while the elongated member 24 adjacent the opposite grid structure side 36 is also spaced apart by approximately half the normal dimension of each rhombic opening. Finally, in connection with the other two remaining grid sides 38 and 40, the angular ends 26 for the rhombic openings are relatively offset for purposes which will be more apparent in connection with the other figures described in greater detail below.

Finally in connection with the spacer grid structure of FIG. 1, it is again noted that a tie rod locking mechanism is contemplated for use in combination with the spacer grid assembly such as that illustrated in FIG. 4. With a plurality of three such tie rods being used with the spacer grid assembly, the tie rods are respectively indicated at 42, 44 and 46 for example in FIG. 2. End portions of selected rhombic openings form circular openings 48, 50 and 52 for receiving the tie rods. Each of the circular openings 48, 50 and 52 has a diameter approximately equal to that of the tie rods 42-26. In addition, each of the circular openings 48, 50 and 52 is formed with an access slot 54, the access slots for the three circular openings 48, 50 and 52 all facing in the same direction. The width of the access slots 54 is less than the full diameter of the circular openings 48-52 and also less than the diameter of the tie rods 42-46.

Figure 2:
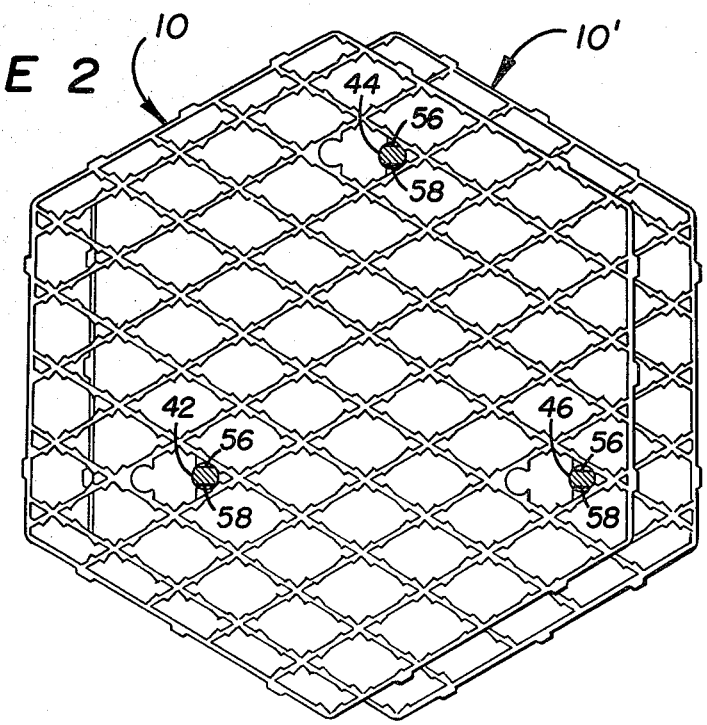
FIG. 2 is a plan view of an assembly of two spacer grids similar to that of FIG. 1, one spacer grid being inverted and laterally offset to facilitate insertion of tie rods through the assembly.

Turning now to FIG. 2, it may be seen that the same spacer grid structure 10 of FIG. 1 is similarly illustrated while a second spacer grid structure 10' is illustrated in inverted and laterally offset relation to the first grid structure 10. With the spacer grid structures 10 and 10' in such inverted relation, their circular openings 48, 50 and 52 are in opposed and mating relation. With this configuration, the tie rods 42-46 may initially be inserted through the rhombic openings including those circular openings, the tie rods then being shifted laterally into one of the circular openings, for example, those of the inverted grid structure 10'.

Each of the tie rods 42, 44 and 46 is formed with opposed chordal flats 56 and 58. The spacing between the two chordal flats is slightly less than the opening formed by the access slots 54 in order to permit the tie rods to be inserted into the circular openings.

Figure 3:
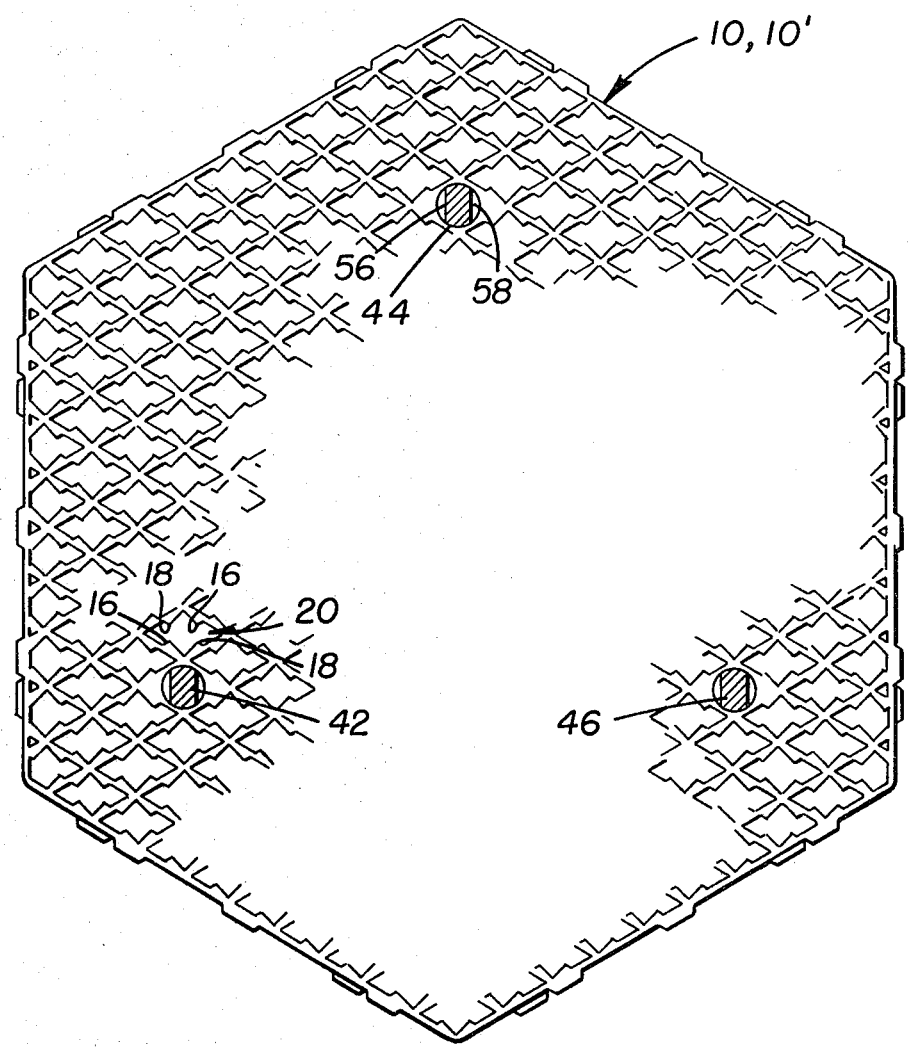
FIG. 3 is a plan view of the same two spacer grids as illustrated in FIG. 2, the spacer grids being arranged in symmetric alignment, the tie rods being illustrated in a rotated position for locking engagement with each spacer grid.
Figure 4:
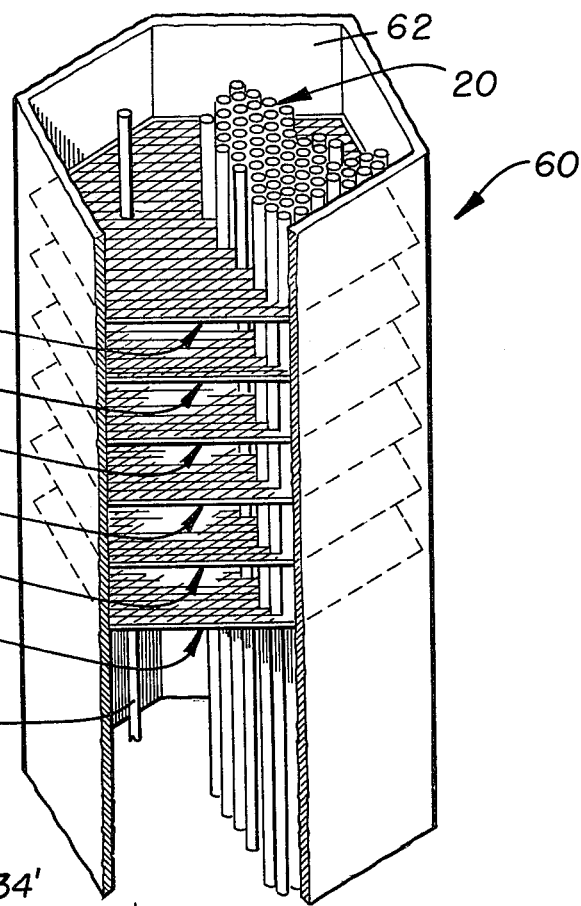
FIG. 4 is a fragmentary perspective view of a plurality of spacer grids constructed in accordance with the present invention and arranged in spaced-apart relation along the length of a fuel rod assembly in a nuclear reactor core.

After the tie rods are arranged within the circular openings for one of the grid structures 10 and 10', referring also to FIG. 3, the two grid structures are then brought into alignment so that the tie rods are also received by the circular openings in the other grid structure 10. Continuing with reference to FIG. 3, the tie rods are then rotated so that their chordal flats 56 and 58 are out of alignment with the access slots 54. In this configuration, the tie rods are captured or locked within the circular openings for both of the grid structures since the full diameter of the tie rods 42-46 is greater than the dimension of the access slots 54.

Referring also to FIG. 4, a portion of a reactor core is generally indicated at 60 and includes a plurality of spaced-apart parallel fuel rods 20 contained within a hexagonal duct or chamber 62. The two relatively inverted spacer grid structures 10 and 10' are illustrated in relatively spaced-apart relation toward the upper ends of the fuel rods. Similar relatively inverted pairs of spacer grid structures of similar construction to those described above are also arranged along the length of the fuel rods, a second relatively inverted pair of grid structures being indicated respectively at 64 and 64' while a third pair of relatively inverted grid structures is indicated at 66 and 66'. The six spacer grid structures 10, 10', 64, 64', 66 and 66' are arranged in spaced apart relation along the length of the fuel rods 20. Each pair of grid structures is similar to that illustrated in FIGS. 2 and 3. As may be seen in FIG. 3, with each pair of relatively inverted spacer grid structures being arranged in axial alignment, their rhombic openings quadrilaterally intersect each other so that the individual fuel rods 20, one of which is illustrated in phantom in FIG. 3, are engaged in opposed relation by the contacts 16 and 18 of each relatively inverted pair of spacer grid structures.

Referring again to FIG. 4, it is further contemplated that each pair of grid structures be rotated through 120° relative to an adjacent pair of grid structures. For example, the pair of grid structures 64 and 64' may be rotated 120° in clockwise or counter-clockwise fashion relative to the first pair of relatively inverted grid structures 10 and 10'. Similarly, the remaining pair of relatively inverted grid structures 66 and 66' may be rotated in the opposite direction from the first inverted of grid structures 10 and 10' by 120°. Referring to FIG. 3, it may then be seen that the contact points 16 and 18 for the three pairs of grid structures will engage each of the fuel rods at locations spaced sixty degrees apart about the periphery of the fuel rod. At the same time, the circular openings 48, 50 and 52 for receiving the three tie rods 42, 44 and 46 are uniformly spaced apart by 120° about each of the grid structures. Thus, as each pair of grid structures is rotated through 120°, the circular openings remain in alignment with each other. The relation between the diameter of the tie rods, the spacing between the chordal flats and the diameter of the access slots 54 is preferably selected so that the tie rod may remain in locked engagement within the circular openings 48-52 for all of the grid structures 10, 10', 64, 64', 66 and 66' even when they are relatively inverted and rotated as illustrated in FIG. 4.

It will be apparent that additional spacer grid structures may also be arranged along the length of the fuel rods 20 in FIG. 4 in order to provide satisfactory support along their lengths. At the same time, the relative order for the six spacer grids illustrated in FIG. 4 may also be changed within the scope of the present invention.

Figure 5:
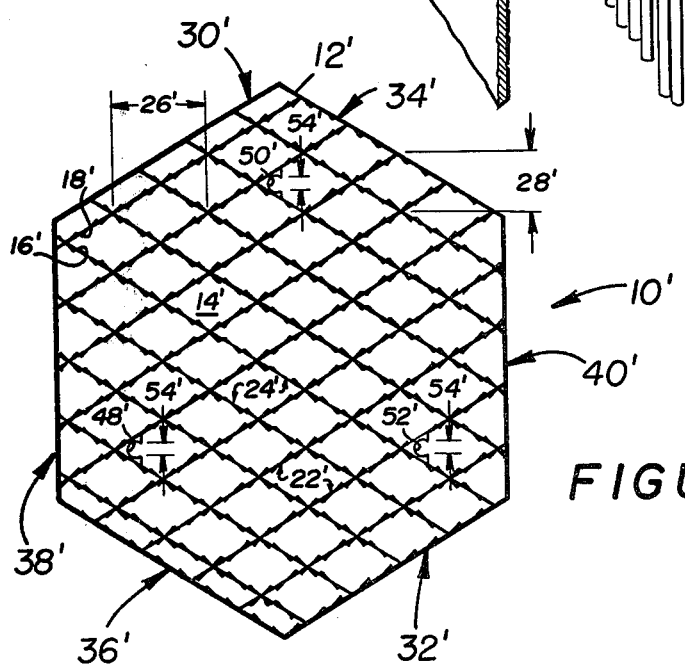
FIG. 5 is a view of a further embodiment of a spacer grid of similar basic configuration as that illustrated in FIG. 1.

Yet another embodiment of the spacer grid structure is illustrated in FIG. 5. The spacer grid structure of FIG. 5 is indicated at 70 and is of similar symmetrical and hexagonal configuration as the structure of FIG. 1 and includes the same asymmetric arrangement of rhombic openings. Accordingly, various features of the spacer grid structure 70 of FIG. 5 are illustrated by primed numerals corresponding to the numerical labels for the same components in the spacer grid structure 10. The spacer grid structure 70 of FIG. 5 varies primarily in that its elongated members or elements 22' and 24' are formed from flat sheet metal strips which are preferably interconnected by means of welding. The contacts 16' and 18' are formed as elongated pads which are welded to the metal strips 22' and 24' in locations corresponding to the elongated bosses forming the contacts 16 and 18 in FIG. 1. The spacer grid structure 70 of FIG. 5 may thus be used in the same manner as described above in connection with FIGS. 1-4.

Accordingly, there has been described a spacer grid assembly and tie rod locking mechanism particularly adapted for retaining a plurality of fuel rods in substantially parallel spaced relation within a reactor core. Numerous modifications are of course possible in addition to those described above. Accordingly, the scope of the present invention is defined only by the following appended claims.

What is claimed is:

1. A spacer grid assemby for retaining a plurality of fuel rods in substantially parallel spaced relation, comprising a plurality of spacer grids spaced-apart along the length of the fuel rods, each spacer grid defining a multiplicity of rhombic openings for receiving from one to four fuel rods, each opening having at least one acute angle and at least one obtuse angle, each opening including a pair of contact means for respectively engaging each fuel rod arranged in said opening, a pair of said contact means being located at each of said acute and obtuse angles, each pair of contact means being arranged for engagement with the respective fuel rods in approximately ninety degree spaced-apart relation, the rhombic openings of adjacent spacer grids being relatively offset with their contact points being arranged for engagement with each fuel rod in opposed relation, means for maintaining the spacer grids in spaced-apart relation, and means for preventing relative rotation of the spacer grids.

2. The spacer grid asembly of claim 1 further comprising pairs of spacer grids being relatively offset with their contact points being arranged for engagement with each fuel rod in opposed relation along the length of the fuel rods.

3. The spacer grid assembly of claim 1 wherein each spacer grid has a symmetric boundary configuration with its rhombic openings being asymmetrically offset whereby, upon inversion of one spacer grid relative to another, their rhombic openings are arranged in quadrisecting overlapping relation with their contact points being arranged for engagement with each fuel rod in opposed relation.

4. The spacer grid assembly of claim 3 wherein the symmetric boundary configuration for each spacer grid is a hexagon, the asymmetric offset arrangement of the rhombic openings being selected to adapt the rhombic openings and contact means in each spacer grid for alignment with each other open angular rotation of one spacer grid relative to another by sixty or one hundred twenty degrees.

5. The spacer grid assembly of claim 4 wherein three pairs of spacer grids are arranged along the length of the fuel rods, each pair of spacer grids having one spacer grid inverted relative to the other, the three pairs of spacer grids being rotated one hundred and twenty degrees relative to each other in order to provide increased angular support for each fuel rod.

6. The spacer grid assembly of claim 5 wherein the contact means are linearly extending configuration to prevent point contact with the fuel rods.

7. The spacer grid assembly of claim 3 wherein the contact means are of linearly extending configuration to prevent point contact with the fuel rods.

8. The spacer grid assembly of claim 1 wherein the contact means are of linearly extending configuration to prevent point contact with the fuel rods.

9. The spacer grid assembly of claim 1 wherein the means for preventing relative rotation between spacer grids comprises at least one tie rod, each of said spacer grids being provided with at least one circular opening in at least one of said rhombic openings, the plurality of spacer grids forming a set of aligned circular openings for receiving the tie rod, each circular opening having an access slot which is narrower than the diameter of the circular opening, the tie rod being formed with at least one chordal flat permitting the tie rod to pass through the slot and then be rotated to assure its capture within each circular opening, and means for fixing the angular position of the tie rod.

10. The spacer grid assembly of claim 9 wherein each of the spacer grids are of symmetric boundary configuration and each include a plurality of circular openings which are uniformly spaced in angular relation about the spacer grids, the uniform spacing of the circular openings facilitating alignment with the tie rods upon relative angular rotation of the spacer grids, the offset relation of the rhombic openings in the symmetric spacer grids being selected to result in angularly spaced-apart relation of the contact points engaging each fuel rod.

11. A tie rod locking mechanism in a spacer grid assembly for retaining a plurality of fuel rods in substantially parallel spaced relation, spacer grids being spaced apart along the length of the fuel rods and including means for positioning the respective fuel rods, comprising sets of circular openings formed by the spacer grids in aligned relation with each other, each circular opening having an access slot which is narrower than the diameter of the circular opening, a tie rod extending through each respective set of openings, the slots facilitating insertion of the tie rods through the spacer grids, each tie rod being formed with at least one chordal flat permitting the tie rod to pass through each slot and then be rotated to insure its capture within the circular openings, and means for fixing the angular position of the tie rods.

12. The tie rod locking mechanism of claim 11 wherein each tie rod includes a pair of chordal flats arranged in opposition to each other, said pair of chordal flats being separated by a distance less than a width of said access slots in said circular openings of said spacer grids.

13. The tie rod locking mechanism of claim 12 wherein the opposed chordal flats extend along the length of each tie rod.

14. The tie rod locking mechanism of claim 11 wherein the spaced-apart spacer grids are of similar configuration and each include rhombic openings for receiving from one to four fuel rods, said rhombic openings each having at least one acute angle and at least one obtuse angle, the circular openings for receiving the tie rods being formed in an acute angle of selected rhombic openings in each spacer grid.

15. The tie rod locking mechanism of claim 11 wherein the spaced-apart spacer grids are of similar symmetric configuration adapted for inversion and angular rotation relative to each other, each spacer grid defining a plurality of circular openings of uniform angular spacing thereupon to permit a plurality of tie rods to extend through the respective circular openings of the inverted and rotated spacer grids.

16. The tie rod locking mechanism of claim 15 wherein the spacer grids are of symmetric hexagonal boundary configuration, each spacer grid including three circular openings arranged in one hundred and twenty degree spaced-apart relation.

17. A spacer grid for use in retaining a plurality of fuel rods in substantially parallel relation, comprising a grid structure defining a multiplicity of rhombic openings for receiving from one to four fuel rods, each of said rhombic openings having at least an acute angle and at least one obtuse angle, each opening including a pair of contact means for respectively engaging each fuel rod arranged in said opening, a pair of said contact means being located at each of said acute and obtuse angles, each pair of contact means being arranged for engagement with the respective fuel rod in approximately ninety degree spaced-apart relation, the grid structure having a symmetric boundary configuration with the multiplicity of rhombic openings being asymmetrically offset whereby, upon inversion of one spacer grid relative to another, their rhombic openings are arranged in quadrisecting and overlapping relation with their contact means being arranged for engagement with each fuel rod in opposed relation.

18. The spacer grid of claim 17 being of integral construction.

19. The spacer grid of claim 18 being formed by an electro-discharge machining process, the contact means being formed as linearly extending bosses.

20. The spacer grid of claim 18 wherein the grid structure is formed from an interconnected arrangement of intersecting flat strips.

21. The spacer grid of claim 20 wherein the flat strips are welded together and the contact means are formed from linearly extending pads secured to the strips within rhombic openings formed thereby.

22. The spacer grid of claim 17 wherein the grid structure has a hexagonal boundary configuration, the asymmetric offset arrangement of the rhombic openings on the grid structure permitting relative angular rotation of selected spacer grids relative to each other by multiples of sixty degress while maintaining engagement of the contact points for each spacer grid structure with the plurality of fuel rods.

* * * * *